(12) United States Patent
Jung et al.

(10) Patent No.: US 11,921,514 B2
(45) Date of Patent: Mar. 5, 2024

(54) MOBILE ROBOT

(71) Applicant: LG ELECTRONICS INC., Seoul (KR)

(72) Inventors: Chungin Jung, Seoul (KR); Sunho Yang, Seoul (KR); Eulpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 836 days.

(21) Appl. No.: 16/982,813

(22) PCT Filed: Jan. 2, 2019

(86) PCT No.: PCT/KR2019/000049
§ 371 (c)(1),
(2) Date: Sep. 21, 2020

(87) PCT Pub. No.: WO2020/141626
PCT Pub. Date: Jul. 9, 2020

(65) Prior Publication Data
US 2021/0034066 A1    Feb. 4, 2021

(51) Int. Cl.
*G05D 1/00* (2006.01)
*B62D 25/00* (2006.01)
*G01L 1/22* (2006.01)

(52) U.S. Cl.
CPC ............ *G05D 1/0227* (2013.01); *B62D 25/00* (2013.01); *G01L 1/22* (2013.01)

(58) Field of Classification Search
CPC ......... B25J 19/00; B25J 19/02; G05D 1/0227; G05D 1/0238; B62D 25/00; B60R 19/483
See application file for complete search history.

(56) References Cited

U.S. PATENT DOCUMENTS

2013/0241217 A1    9/2013    Hickey et al.
2014/0009561 A1*   1/2014    Sutherland ............ H04N 7/185
                                                    348/14.05
(Continued)

FOREIGN PATENT DOCUMENTS

JP          2006-64408 A     3/2006
KR     10-2009-0005616 A     1/2009
(Continued)

OTHER PUBLICATIONS

International Search Report issued in PCT/KR2019/000049 (PCT/ISA/210), dated Oct. 1, 2019.

*Primary Examiner* — Mirza F Alam
(74) *Attorney, Agent, or Firm* — Birch, Stewart, Kolasch & Birch, LLP

(57) ABSTRACT

According to an embodiment of the present disclosure, a mobile robot may include an outer cover including an insulating material and defining an appearance; an inner cover including an insulating material and configured to define a predetermined gap with respect to the outer cover; a battery disposed inside the inner cover; and at least one pressure sensing module disposed in the gap between the outer cover and the inner cover. The pressure sensing module may include an outer metal panel contacting an inner periphery of the outer cover, an inner metal panel contacting an outer periphery of the inner cover and spaced apart from the outer metal panel, and a pressure sensing sheet pressed between the outer metal panel and the inner metal panel and having a variable resistance. The battery may generate an electric potential difference between the outer metal panel and the inner metal panel.

20 Claims, 13 Drawing Sheets

(56) References Cited

U.S. PATENT DOCUMENTS

| | | |
|---|---|---|
| 2016/0051104 A1 | 2/2016 | Shin et al. |
| 2016/0347120 A1 | 12/2016 | Barberis et al. |
| 2018/0178375 A1* | 6/2018 | Yang ........................ B25J 5/007 |
| 2018/0178377 A1* | 6/2018 | Yang ...................... B25J 9/0009 |
| 2019/0115808 A1* | 4/2019 | Soda .................. H05K 7/14324 |

FOREIGN PATENT DOCUMENTS

| | | |
|---|---|---|
| KR | 10-2011-0122332 A | 11/2011 |
| KR | 10-2013-0020062 A | 2/2013 |
| KR | 10-2014-0119276 A | 10/2014 |
| WO | WO 2017/085589 A1 | 5/2017 |

\* cited by examiner

【Figure 1】
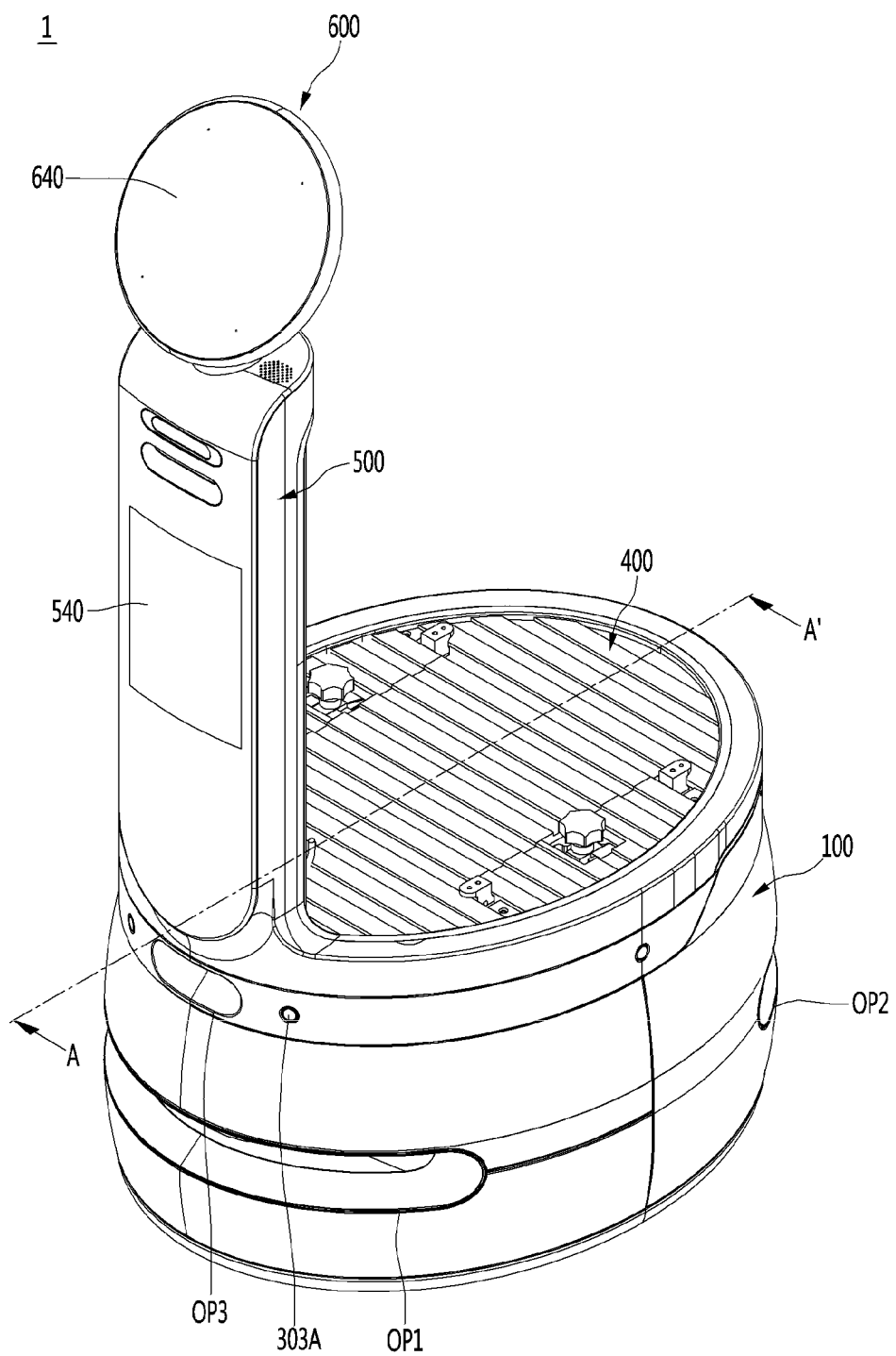

[Figure 2]
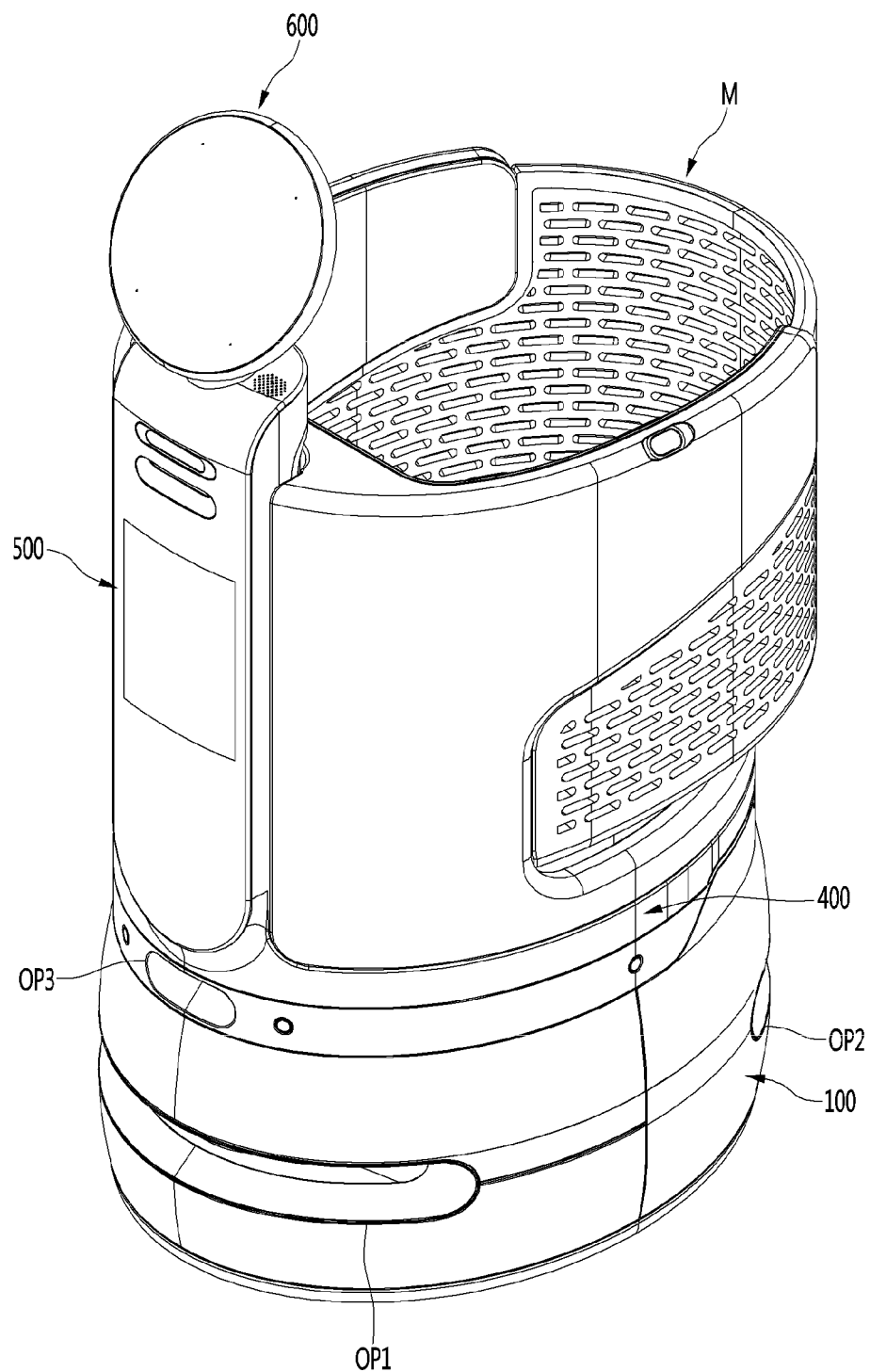

【Figure 3】
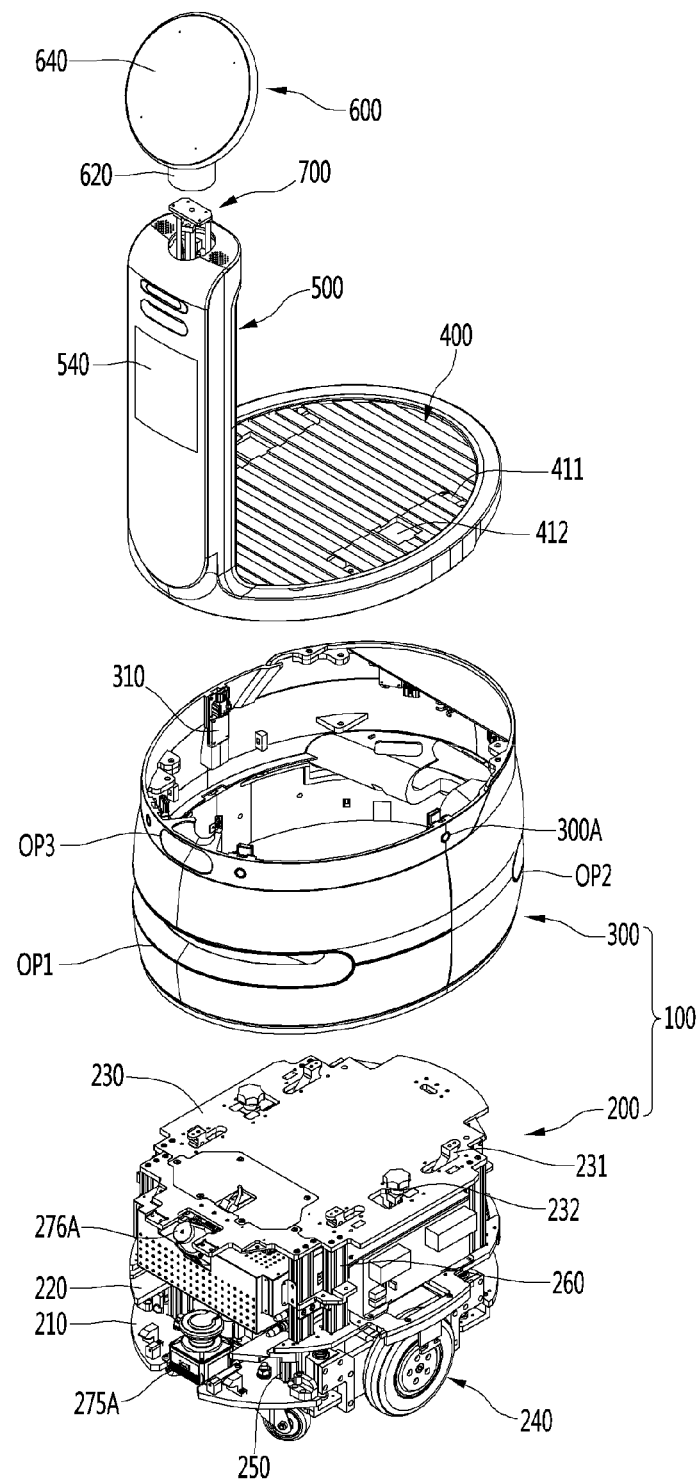

【Figure 4】
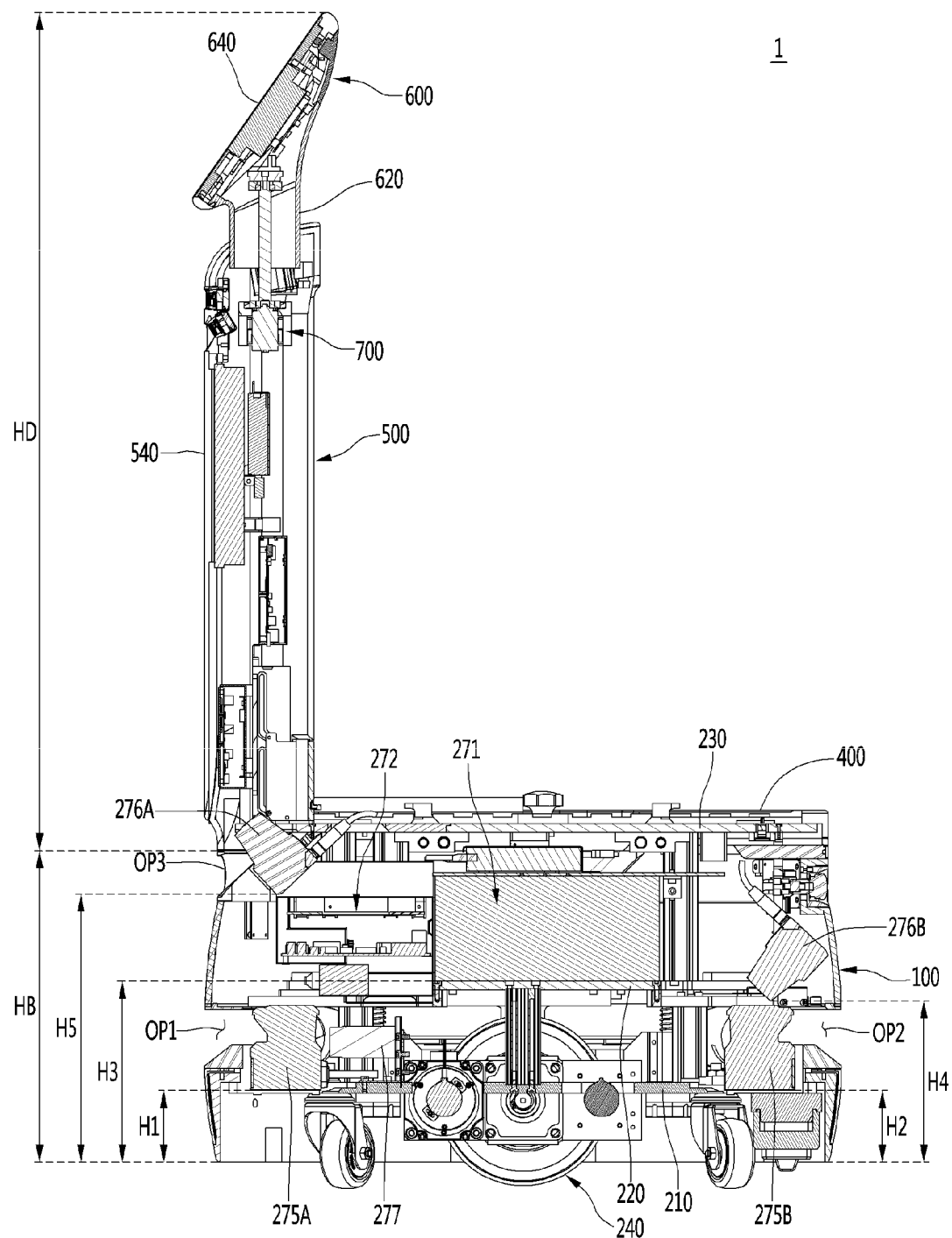

【Figure 5】
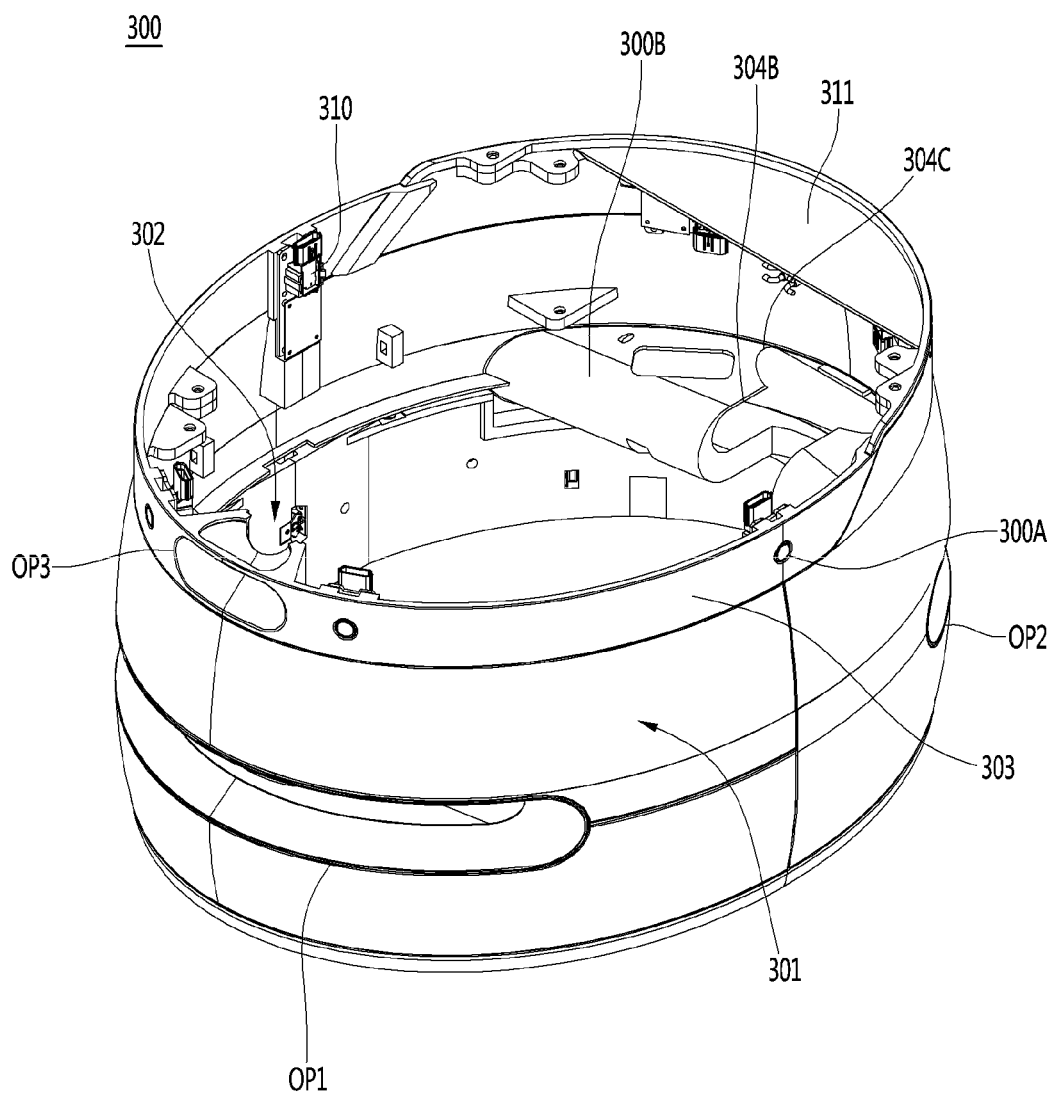

【Figure 6】
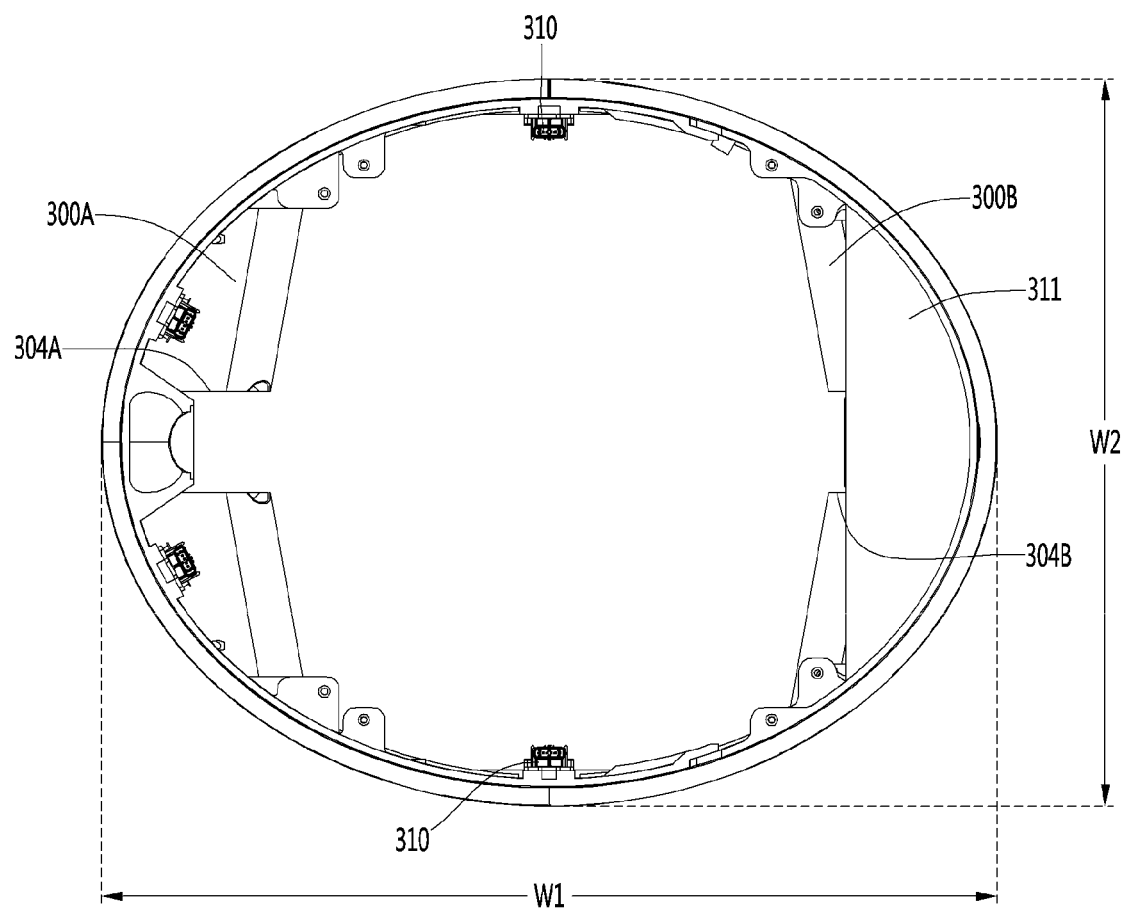

[Figure 7]
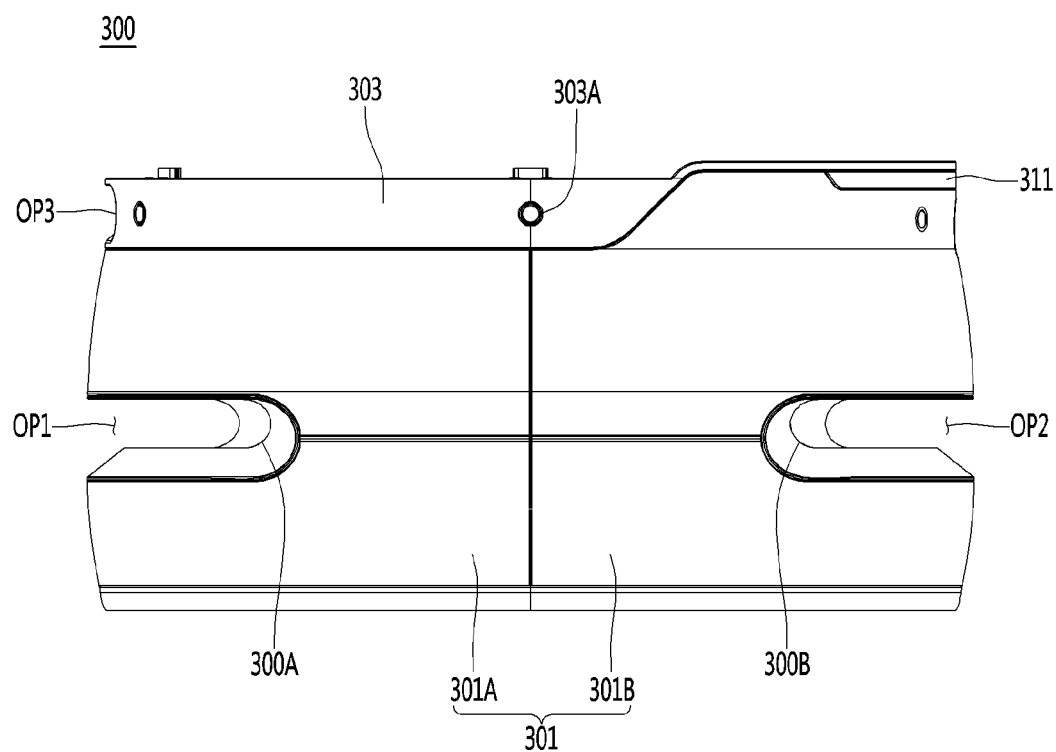

[Figure 8]
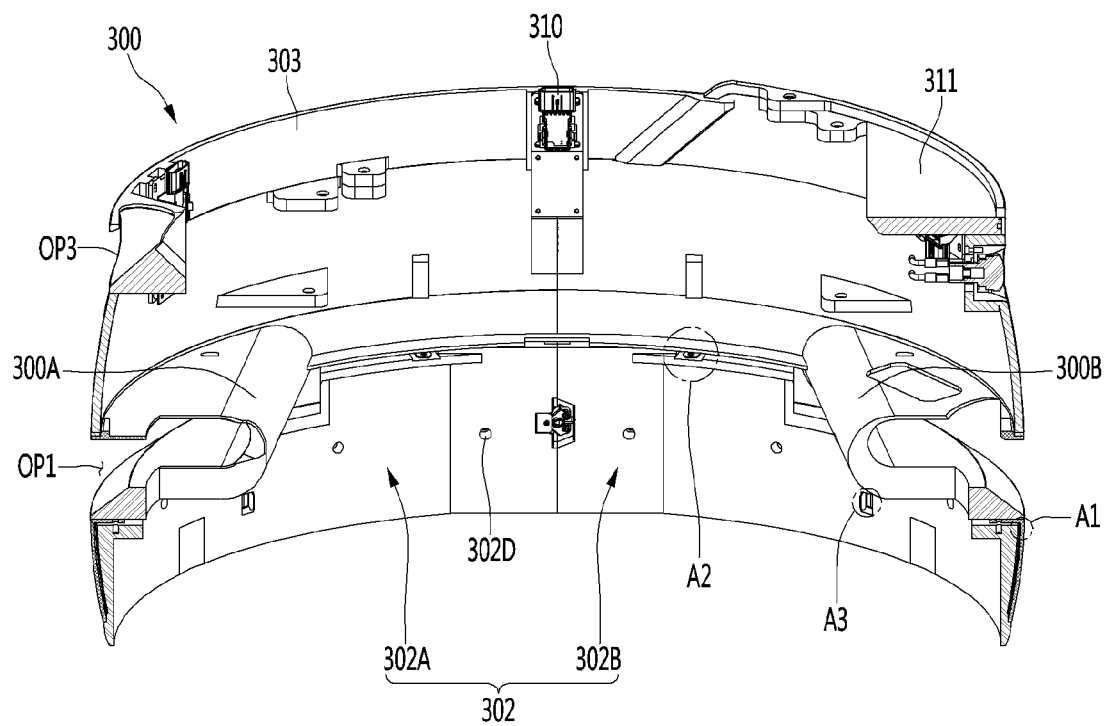

[Figure 9]
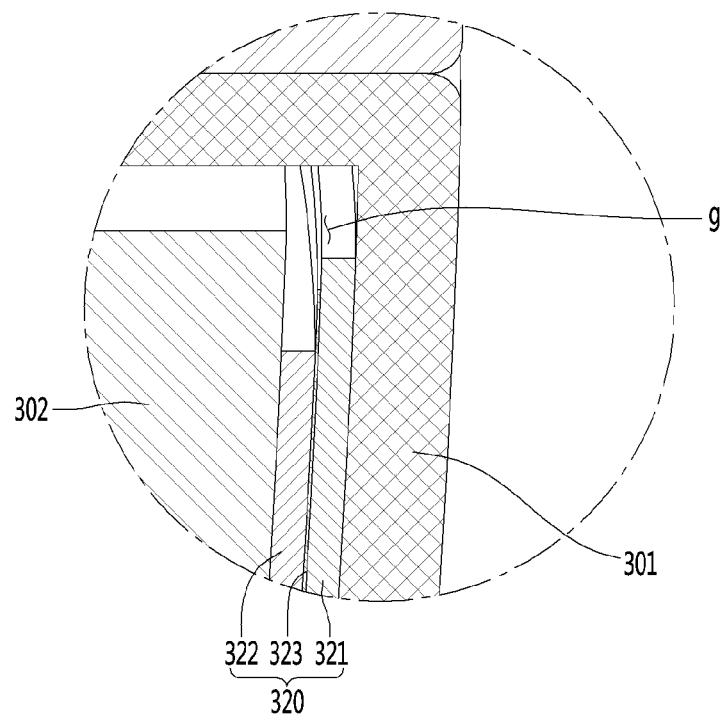

[Figure 10]
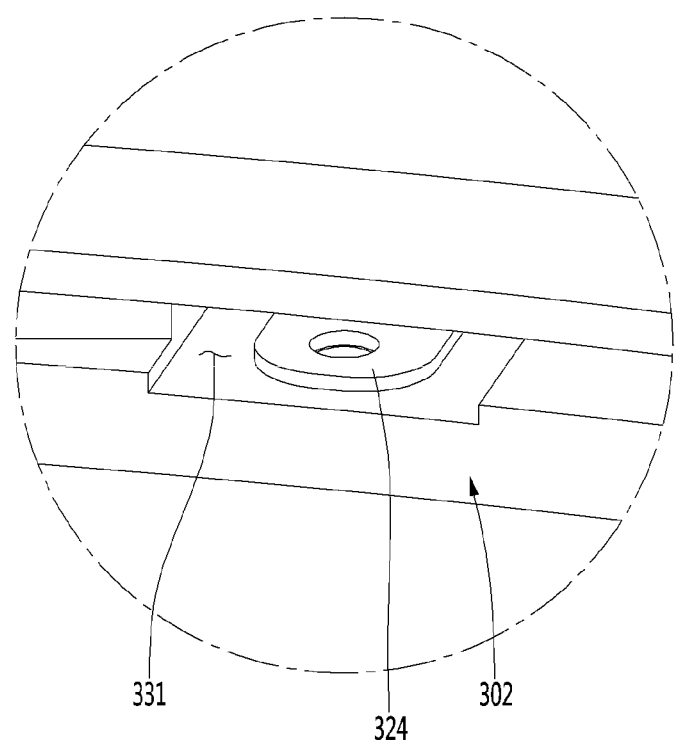

【Figure 11】
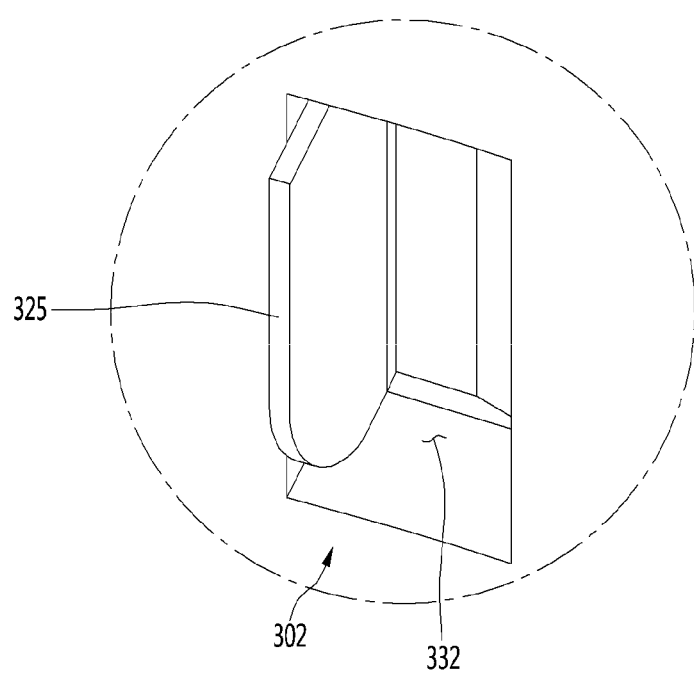

【Figure 12】
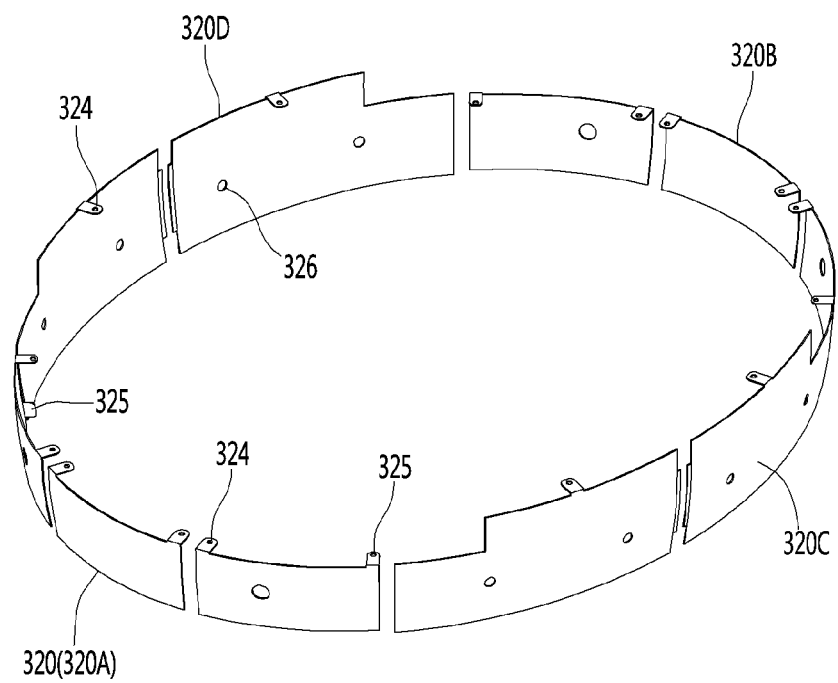

【Figure 13】
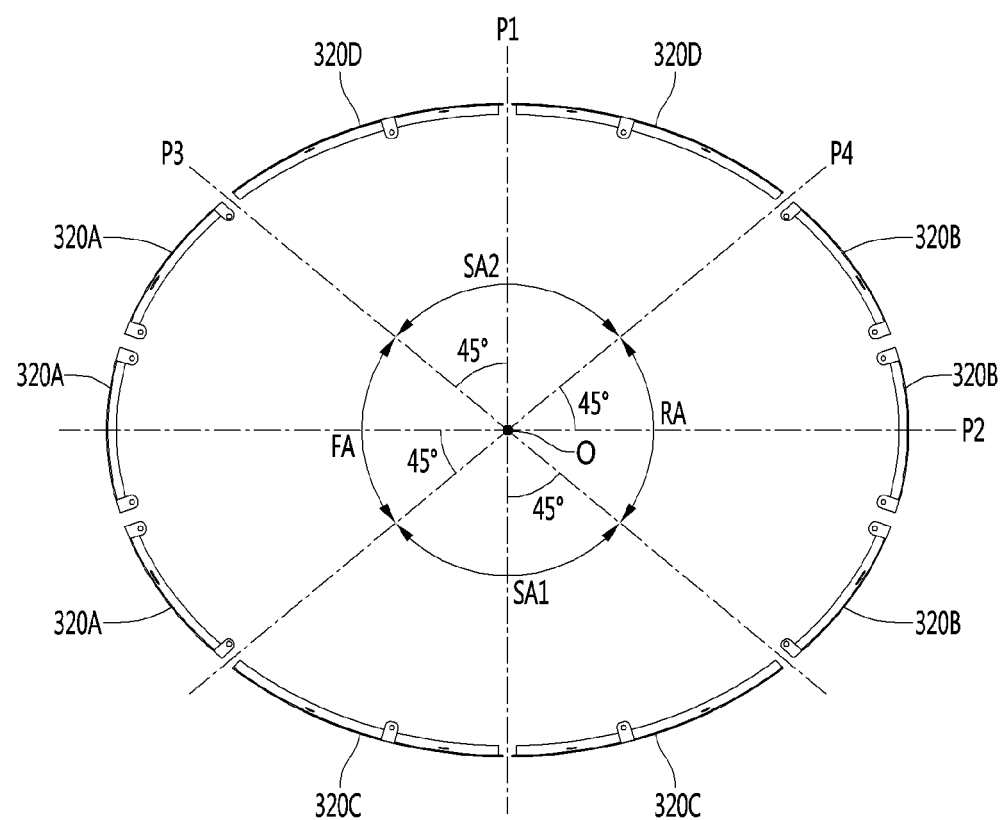

MOBILE ROBOT

CROSS REFERENCE TO RELATED APPLICATIONS

This application is the National Phase of PCT International Application No. PCT/KR2019/000049, filed on Jan. 2, 2019, the entirety of which is hereby expressly incorporated by reference into the present application.

TECHNICAL FIELD

The present disclosure relates to a mobile robot capable of autonomous driving.

BACKGROUND ART

Robots have been developed for industrial use to take part in factory automation. In recent years, the field of application of robots is expanding, and robots that can be used in daily life have been developed in addition to medical robots and aerospace robots.

The robots for daily life provide a specific service (e.g., shopping, serving, conversation, cleaning, or the like) in response to a user's command.

However, an existing robot for daily life is designed to provide only a specific service, and thus there is a problem in that utilization is not high compared to costs invested in developing the robot.

Accordingly, a need for a robot that can provide various services has recently emerged.

DISCLOSURE

Technical Problem

An object to be achieved by the present invention is to provide a mobile robot capable of detecting a collision with a person or an obstacle.

Technical Solution

According to an embodiment of the present disclosure, a mobile robot may include an outer cover including an insulating material and defining an appearance, an inner cover including an insulating material and configured to define a predetermined gap with respect to the outer cover, a battery disposed inside the outer cover, and at least one pressure sensing module disposed in the gap between the outer cover and the inner cover. The pressure sensing module may include an outer metal panel configured to be in contact with an inner periphery of the outer cover, an inner metal panel configured to be in contact with an outer periphery of the inner cover and spaced apart from the outer metal panel, and a pressure sensing sheet pressed between the outer metal panel and the inner metal panel and having a variable resistance. The battery may generate an electric potential difference between the outer metal panel and the inner metal panel.

The pressure sensing module may be provided in a lower portion of the outer cover.

The pressure sensing module may be provided in plural, the plurality of pressure sensing modules being spaced apart from each other along a peripheral direction of the outer cover.

The pressure sensing module may have an arc shape.

The pressure sensing modules may have a higher deployment density in a front portion and a rear portion of the outer cover than that in a side portion of the outer cover.

The plurality of pressure sensing modules may include a front sensing module configured to face a front side; a rear sensing module configured to face a rear side; a first side sensing module configured to face one side; and a second side sensing module configured to face the other side, and the number of the front sensing modules may be greater than the number of the first side sensing modules and the number of the second side sensing modules.

The number of the rear sensing modules may be greater than the number of the first side sensing modules and the number of the second side sensing modules.

The length of the front sensing module may be shorter than a length of the first side sensing module and a length of the second side sensing module with respect to the peripheral direction of the outer cover.

The length of the rear sensing module may be shorter than a length of the first side sensing module and a length of the second side sensing module with respect to the peripheral direction of the outer cover.

The inner cover may include a first slit through which an outer terminal connected to the outer metal panel passes, and a second slit through which an inner terminal connected to the inner metal panel passes.

The inner cover is provided with an insulating sheet on an inner periphery thereof.

According to an embodiment of the present disclosure, a mobile robot may include a housing defining an appearance, an inner module disposed inside the housing and provided with a driving unit in a lower portion thereof; and a battery disposed in the inner module. The housing may include an outer cover including an insulating material; an inner cover including an insulating material and configured to define a predetermined gap with respect to the outer cover; and at least one pressure sensing module disposed in the gap between the outer cover and the inner cover. The pressure sensing module may include an outer metal panel configured to be in contact with an inner periphery of the outer cover, an inner metal panel configured to be in contact with an outer periphery of the inner cover and spaced apart from the outer metal panel, and a pressure sensing sheet pressed between the outer metal panel and the inner metal panel and having a variable resistance. The battery may be configured to generate an electric potential difference between the outer metal panel and the inner metal panel.

Advantageous Effects

According to the preferred embodiment of the present disclosure, the pressure sensing module may be included in the housing defining an appearance. Accordingly, the sensitivity of the pressure sensing module that detects an impact applied to the housing may be improved.

In addition, since the housing includes a pressure sensing module, the installation space of the pressure sensing module may be minimized. Accordingly, it is possible to make the mobile robot compact.

In addition, the outer cover including an insulating material may surround the outer metal panel from the outside. Thus, it is possible to prevent the current applied to the outer metal panel from being shorted to the outside of the mobile robot.

In addition, the inner cover including the insulating material may surround the inner metal panel from the interior thereof. Thus, it is possible to prevent the current applied to the inner metal panel from affecting the inner module inside the housing.

In addition, the pressure sensing sheet is pressed between the outer metal panel and the inner metal panel, and the resistance may vary. Thus, it is possible to easily detect the intensity of an impact applied to the housing according to the amount of change in the resistance of the pressure sensing sheet.

In addition, the battery embedded in the interior of the body not only provides power required for traveling and operation of the mobile robot, but also generates an electric potential difference between the outer metal panel and the inner metal panel.

In addition, the pressure sensing module may be provided in the lower portion of the outer cover. Accordingly, it is possible to more accurately detect an impact applied to the lower portion of the housing, which is a location where a collision occurs more frequently during of traveling of the mobile robot.

In addition, the plurality of pressure sensing modules may be provided to be spaced apart from each other along the peripheral direction of the outer cover. Accordingly, the direction of an impact applied to the housing may be detected more accurately.

In addition, since the mobile robot has a higher probability of collision in the front and rear sides than the possibility of collision in the lateral sides, the deployment density of the pressure sensing modules may be higher in the front portion and the rear portion of the outer cover than the side portions of the outer cover. As a result, it is possible to sensitively detect the direction and intensity of the impact in the front or rear sides.

In addition, the number of front/rear sensing modules may be greater than the number of the first side sensing modules and the number of the second side sensing modules individually. As a result, it is possible to more sensitively detect the direction and intensity of the impact in the front/rear side.

In addition, the length of the front/rear sensing module may be shorter than a length of the first side sensing module and a length of the second side sensing module. As a result, more front/rear sensing modules may be arranged in a limited space.

In addition, the first slit through which the outer terminal passes and the second slit through which the inner terminal passes may be formed in the inner cover. As a result, the battery disposed inside the inner cover may easily apply a voltage to the outer metal panel and the inner metal panel, individually.

In addition, the insulating sheet may be provided on the inner periphery of the inner cover. Therefore, it possible to insulate the pressure sensing module more reliably.

DESCRIPTION OF DRAWINGS

FIG. 1 is a perspective view of a mobile robot according to an embodiment of the present disclosure.

FIG. 2 is a perspective view of a service module mounted to a mobile robot according to an embodiment of the present disclosure.

FIG. 3 is an exploded perspective view of a mobile robot according to an embodiment of the present disclosure.

FIG. 4 is a cross-sectional view taken along line A-A' in FIG. 1.

FIG. 5 is a perspective view of a housing according to an embodiment of the present disclosure.

FIG. 6 is a plan view of a housing according to an embodiment of the present disclosure.

FIG. 7 is a side view of a housing according to an embodiment of the present disclosure.

FIG. 8 is a cross-sectional view showing an interior of a housing.

FIG. 9 is an enlarged view of "A1" in FIG. 8.

FIG. 10 is an enlarged view of "A2" in FIG. 8.

FIG. 11 is an enlarged view of "A3" in FIG. 8.

FIG. 12 is a perspective view showing a plurality of pressure sensing modules according to an embodiment of the present disclosure.

FIG. 13 is a plan view showing a plurality of pressure sensing modules according to an embodiment of the present disclosure.

MODE FOR INVENTION

Hereinafter, specific embodiments of the present disclosure will be described in detail with reference to the drawings.

FIG. 1 is a perspective view of a mobile robot according to an embodiment of the present disclosure, FIG. 2 is a perspective view of a service module mounted to a mobile robot according to an embodiment of the present disclosure, and FIG. 3 is an exploded perspective view of a mobile robot according to an embodiment of the present disclosure.

A mobile robot 1 according to the embodiment of the present disclosure may include a body 100, a driving unit 240, a module support plate 400, a display unit 500 and 600, and a rotation mechanism 700.

The body 100 may constitute the body portion of the mobile robot 1.

A length of the body 100 in the front-rear direction may be longer than a width of the body 100 in the left-right direction. As an example, the cross-section of the body 100 in a horizontal direction may have an approximately elliptical shape.

The body 100 may include an inner module 200 and a housing 300 surrounding the inner module 200.

The inner module 200 may be positioned inside the housing 300. The driving unit 240 may be provided with the inner module 200 in a lower portion thereof.

The inner module 200 may include multiple plates and multiple frames. In more detail, the inner module 200 may include a lower plate 210, an upper plate 220 positioned above the lower plate 210, and a top plate 230 positioned above the upper plate 220. In addition, the inner module 200 may further include a plurality of lower supporting frames 250 and a plurality of upper supporting frames 260.

The lower plate 210 may form a bottom surface of the body 100. The lower plate 210 may be referred to as a base plate. The lower plate 210 may be horizontal. The lower plate 210 may be provided with the driving unit 240.

The upper plate 220 may be spaced apart upward from the lower plate 210. The upper plate 220 may be referred to as a middle plate. The upper plate 220 may be horizontal. The upper plate 220 may be positioned between the lower plate 210 and the top plate 230 in the vertical direction.

The lower supporting frame 250 may be positioned between the lower plate 210 and the upper plate 220. The lower supporting frame 250 may be formed to extend vertically. The lower supporting frame 250 may support the upper plate 220 from the lower side.

The top plate 230 may form a top surface of the body 100. The top plate 230 may be spaced upward from the upper plate 220.

The upper supporting frame 260 may be positioned between the upper plate 220 and the top plate 230. The upper supporting frame 260 may be formed to extend vertically. The upper supporting frame 260 may support the top plate 230 from the lower side.

The housing 300 may form an outer peripheral surface of the main body 100. A space in which the inner module 200 is disposed may be formed inside the housing 300. The top and bottom surfaces of the housing 300 may be opened.

The housing 300 may surround the edges of the lower plate 210, the upper plate 220, and the top plate 230. In this case, an inner periphery of the housing 300 may be in contact with the edges of the lower plate 210, the upper plate 220, and the top plate 230, but is not limited thereto.

A front open portion OP1 may be formed in a front portion of the housing 300. The front open portion OP1 may be opened toward the front. The front open portion OP1 may be formed to extend along the peripheral direction of the housing 300. A front lidar 275A may detect an obstacle or the like positioned in front of the mobile robot 1 through the front open portion OP1 or perform mapping for a front region of the mobile robot 1.

A rear open portion OP2 may be formed in a rear portion of the housing 300. The rear open portion OP2 may be opened toward the rear. The rear open portion OP2 may be formed to extend along the peripheral direction of the housing 300. The rear lidar 275B (see FIG. 4) may detect an obstacle or the like positioned behind the mobile robot 1 through the rear open portion OP2 or perform mapping for a rear region of the mobile robot 1. In addition, a back cliff sensor 276B (see FIG. 4) may detect a state of a floor surface behind the mobile robot 1 through the rear open portion OP2.

An upper open portion OP3 may be formed in the front portion of the housing 300. The upper open portion may be formed above the front open portion OP1. The upper open portion OP3 may be opened toward the front side or a front lower side. The cliff sensor 276A may detect the state of the floor surface in front of the mobile robot 1 through the upper open portion OP3.

A plurality of openings 303A may be formed in the housing 300. In more detail, the opening 303A may be formed in the top portion of the housing 300. The plurality of openings 303A may be spaced apart from each other along the peripheral direction of the housing 300. Each ultrasonic sensor 310 may detect an object around the mobile robot 1 through the opening 303A.

The housing 300 may include a material having a first thermal conductivity, and the inner module 200 may include a material having a second thermal conductivity higher than the first thermal conductivity. In more detail, at least one of the lower plate 210, the upper plate 220, the top plate 230, the lower supporting frame 250 and the upper supporting frame 260 may include a material having a second thermal conductivity higher than the first thermal conductivity.

As an example, the housing 300 may include an injection plastic material, and at least one of the lower plate 210, the upper plate 220, the top plate 230, the lower supporting frame 250 and the upper supporting frame 260 may include a metal material such as aluminum.

Accordingly, a heat dissipation part disposed in the inner module 200 may be smoothly dissipated by conduction while preventing the housing 300 defining the appearance of the body 100 from becoming hot.

The driving unit 240 may enable the mobile robot 1 to move. The driving unit 240 may be provided below the body 100. In more detail, the driving unit 240 may be provided in the lower plate 210.

On the other hand, the module support plate 400 may be mounted on the top surface of the body 100. The module support plate 400 is preferably a horizontal plate shape, but is not limited thereto.

Like the body 100, the module support plate 400 may be formed to extend such that a length in the front-rear direction is longer than a width in the left-right direction.

The module support plate 400 may support a service module M from the lower side. That is, the service module M may be seated and supported on the module support plate 400.

The service module M may be detachably mounted to the module support plate 300.

In this case, the mobile robot 1 of the present disclosure may be referred to as a "mobile module", and the entire configuration including the mobile module 1 and the service module M may also be referred to as a "mobile robot". However, to avoid confusion in the description, these names should not be used below.

The service module M may be a transport object carried by the mobile robot 1, and its type is not limited. Therefore, there is an advantage that it is possible to mount and use different service modules M to the same mobile robot 1.

As an example, the service module M may be a cart capable of accommodating articles. In this case, the mobile robot 1 equipped with a cart may be used in a mart, and a user has an advantage of not having to push the cart directly.

The top surface of the body 100, that is, the top plate 230 may be provided with at least one of at least one module guide 231 configured to guide the installation position of the service module M and at least one module fastening portion 232 fastened to the service module M.

The module guide 231 and the module fastening portion 232 may protrude upward from the top plate 230.

The module guide 231 may pass through a sub through hole 411 formed in the module support plate 400, and prevent the service module M from shaking in the horizontal direction while guiding the installation position of the service module M.

The module fastening portion 232 may pass through the sub-opening hole 412 formed in the module support plate 400 and be fastened to the service module M. Therefore, the service module M may be firmly mounted to the upper side of the module support plate 400.

The module guide 231 and the module fastening portion 232 may also be used as handles when carrying the mobile robot 1.

Meanwhile, the display unit 500 and 600 may be positioned above the front portion of the main body 100. The display units 500 and 600 may be disposed to extend vertically. A height HD of the display unit 500 and 600 (see FIG. 4) may be higher than a height HB of the body 100.

In more detail, the display unit 500 and 600 may include a body display unit 500 and a head display unit 600.

The body display unit 500 may be integrally formed with the module support plate 400. In this case, the body display unit 500 may be formed to extend upward from the front end of the module support plate 400. However, it is of course possible that the body display unit 500 and the module support plate 400 are formed of separate members.

A height of the body display unit 500 may be higher than a height of the body 100.

The body display unit 500 may include a body display 540 provided on a front surface thereof. The body display 540 may function as an output unit on which an image or video is displayed. At the same time, the body display 540 may include a touch screen to function as an input unit capable of enabling touch input.

The body display unit 500 may be positioned in front of the service module M mounted on the module support plate 400. In this case, a groove corresponding to a shape of the body display unit 500 may be formed in the front portion of the service module M, and the body display unit 500 may be fitted into the groove. That is, the body display unit 500 may guide a mounting position of the service module M.

The head display unit 600 may be positioned above the body display unit 500. The head display unit 600 may be rotatably connected to an upper portion of the body display unit 500.

In more detail, the head display unit 600 may include a neck housing 620 rotatably connected to the body display unit 500. The rotation mechanism 700 may rotate the head display unit 600 through the interior of the neck housing 620.

The head display unit 600 may include a head display 640 provided on a front surface thereof. The head display 600 may face the front side or a front upper side. The head display 640 may display an image or video depicting a human expression. Accordingly, the user may feel that the head display unit 600 is similar to a human head.

The head display unit 600 may rotate a certain range (for example, 180 degrees) left and right with respect to the vertical axis of rotation, like a human head.

The rotation mechanism 700 may rotate the head display unit 600 with respect to the body display unit 500. The rotation mechanism 700 may include a rotating motor and a rotating shaft rotated by the rotating motor. The rotating motor may be disposed inside the body display unit 500, and the rotating shaft may extend from the interior of the body display unit 500 into the neck housing 620 and be connected to the head display unit 600.

FIG. 4 is a cross-sectional view taken along line A-A' in FIG. 1;

A battery 271 and a control box 272 may be embedded in the body 100. Further, the body 100 may include a front lidar 275A and a rear lidar 275B embedded therein.

Electric power for the operation of the mobile robot 1 may be stored in the battery 271.

The battery 271 may be supported by the upper plate 220 of the inner module 200. The battery 271 may be disposed between the upper plate 220 and the top plate 230.

The battery 271 may be disposed eccentrically from the interior of the body 100 to the rear.

Also, the display unit 500 and 600 may be supported by the top plate 230 of the inner module 200. The display unit 500 and 600 may be disposed above the front portion of the top plate 230. The body display unit 400 may not overlap the battery 271 in the vertical direction.

With the above configuration, the load of the battery 271 and the load of the body display unit 500 and the head display unit 600 may be balanced. Thereby, it is possible to prevent the mobile robot 1 from being tilted or overturned back and forth.

The control box 272 may be disposed in front of the battery 271. The control box 272 may be supported by the upper plate 220 of the inner module 200. The control box 272 may be disposed between the upper plate 220 and the top plate 230. At least a portion of the control box 272 may overlap the display unit 500 and 600 vertically.

The control box 272 may include a box-shaped boxing case and a controller provided in the boxing case. A plurality of through holes may be formed in the boxing case to dissipate internal heat of the control box 272. The controller may include a PCB, and may control the overall operation of the mobile robot 1.

Since the control box 272 is positioned in front of the battery 271, the load of the battery 271 eccentric to the rear and the load of the control box 272 may be balanced. Thereby, it is possible to prevent the mobile robot 1 from being tilted or overturned back and forth.

The front lidar 275A and the rear lidar 275B may be provided in the front and rear portions of the body 100, respectively.

LIDAR is a sensor capable of detecting a distance and various properties of an object by radiating a laser beam to a target and the front lidar 275A and the rear lidar 275B may detect surrounding objects, terrain features, and the like. A controller of the control box 272 may receive information detected by the front lidar 275A and the rear lidar 275B, and perform 3D mapping or control the driving unit 240 to avoid an obstacle based on the information.

As described above, the front lidar 275A may detect information on a front region of the mobile robot 1 through the front open portion OP1 formed in a front portion of the body 100. The rear lidar 275B may detect information on a rear region of the mobile robot 1 through the rear open portion OP2 formed in a rear portion of the body 100.

At least a portion of the front lidar 275A may be positioned below the control box 272.

The front lidar 275A and the rear lidar 275B may be positioned at the same height inside the body 100.

In more detail, a vertical distance H1 from the bottom surface of the body 100 to the front lidar 275A may be equal to a vertical distance H2 from the bottom surface of the body 100 to the rear lidar 275B.

In addition, the front lidar 275A and the rear lidar 275B may be disposed inside the body 100 at a lower position than the battery 271.

The front lidar 275A and the rear lidar 275B may be supported by the lower plate 210 of the inner module 200. The front lidar 275A and the rear lidar 275B may be disposed between the lower plate 210 and the upper plate 220.

In more detail, a vertical distance H3 from the bottom surface of the body 100 to the battery 271 may be greater than the vertical distance H1 from the bottom side of the body 100 to the front lidar 275A. In addition, the vertical distance H3 from the bottom surface of the main body 100 to the battery 271 may be greater than the vertical distance H2 from the bottom surface of the body 100 to the rear lidar 275B.

As a result, a space inside the body 100 may be effectively utilized as compared with a case where the front lidar 275A and the rear lidar 275B are disposed at the same height as the battery 271. Therefore, the size of the body 100 may be made compact.

A cliff sensor 276A and a back cliff sensor 276B may be embedded in the body 100.

The cliff sensor 276A and the back cliff sensor 276B may be supported by being suspended from the top plate 230 of the inner module 200. The cliff sensor 276A and the back cliff sensor 276B may be disposed between the upper plate 220 and the top plate 230.

The cliff sensor may detect a state of the floor surface and the presence or absence of a cliff by transmitting and receiving infrared rays. That is, the cliff sensor 276A and the back cliff sensor 276B may detect the state of the floor surface of the front and rear regions of the mobile robot 1 and the presence or absence of a cliff. The controller of the control box 272 may receive information detected by the cliff sensor 276A and the back cliff sensor 276B, and control the driving unit 240 such that the mobile robot 1 avoids cliffs based on the information.

As described above, the cliff sensor 276A may detect the state of the floor surface in front of the mobile robot 1 through the upper open portion OP3. The back cliff sensor 276B may detect the state of the floor surface behind the mobile robot 1 through the rear open portion OP2.

The cliff sensor 276A may be disposed above the front lidar 275A. The back cliff sensor 276B may be disposed above the rear lidar 276B.

At least a portion of the cliff sensor 276A may be positioned above the control box 272. The back cliff sensor 276B may be positioned behind the battery 271.

That is, the cliff sensor 276A may be disposed within the body 100 at a higher position than the back cliff sensor 276B.

In more detail, a vertical distance H4 from the bottom surface of the body 100 to the cliff sensor 276A may be greater than a vertical distance H5 from the bottom surface of the body 100 to the back cliff sensor 276B.

As a result, a space inside the body 100 may be efficiently utilized as compared with a case where the cliff sensor 276A is positioned in front of the control box 272. Therefore, the body 100 may be compact with respect to the front-rear direction.

Meanwhile, a wiring disconnect switch 277 may be embedded in the body 100. The wiring disconnect switch 277 may cut off the power of the mobile robot 1 to immediately stop driving of the mobile robot 1.

The wire disconnect switch 277 may be positioned behind the front lidar 275A. The wire blocking switch 277 may be supported by the lower plate 210 of the inner module 200.

FIG. 5 is a perspective view of a housing according to an embodiment of the present disclosure, FIG. 6 is a plan view of a housing according to an embodiment of the present disclosure, FIG. 7 is a side view of a housing according to an embodiment of the present disclosure, and FIG. 8 is a cross-sectional view showing an interior of a housing.

A length W1 of the housing 300 in the front-rear direction may be longer than a width W2 thereof in the left-right direction.

The housing 300 may include an outer cover 301 and an inner cover 302 positioned inside the outer cover 301. The housing 300 may further include an upper cover 303 positioned on an upper end of the outer cover 301.

The outer cover 301 may define the appearance of the body 100. The horizontal cross-sectional shape of the outer cover 301 may have an generally elliptical shape.

The outer cover 301 may include a first outer cover 301A and a second outer cover 301B detachably fastened to the first outer cover 301A.

The first outer cover 301A may form a front portion of the outer cover 301 and the second outer cover 301B may form a rear portion of the outer cover 301. The first outer cover 301A may be formed with a front open portion OP1 and the second outer cover 301B may be formed with a rear open portion OP2.

Like the outer cover 301, the inner cover 302 may also include a first inner cover 302A and a second inner cover 302B which are detachably fastened to each other. In this case, the first inner cover 302A may be fastened to the first outer cover 301A, and the second inner cover 302B may be fastened to the second outer cover 301B.

Accordingly, the first outer cover 301A and the first inner cover 302A may be referred to as a first housing body 301A and 302A, and the second outer cover 301B and the second inner cover 302B may be referred to as a second housing body 301B and 302B. That is, the housing 300 may include a first housing body 301A and 302A and a second housing body 301B and 302B which are detachably fastened to each other. Accordingly, an operator may easily access the inner module 200 by separating the housing 300 into first housing body 301A and 302A and the second housing body 301B and 302B during maintenance of the mobile robot.

The inner cover 302 may be provided inside the outer cover 301. In more detail, the inner cover 302 may be provided inside a lower portion of the outer cover 301.

A pressure sensing module 320 (see FIG. 9) may be provided between the inner cover 302 and the outer cover 301. Accordingly, when an obstacle or the like collides with the outer cover 301 while the mobile robot 1 is traveling, the pressure sensing module 320 may detect an impact.

The upper cover 303 may be formed along the upper end of the outer cover 301. The upper cover 303 may have a generally ring shape.

The upper cover 303 may be formed with an upper open portion OP3.

A plurality of ultrasonic sensors 310 may be provided to be spaced apart from each other along the peripheral direction of the upper cover on the inner periphery of the upper cover 303. In this case, an opening 303A may be formed in the upper cover 303 at a position corresponding to each ultrasonic sensor 310. As a result, the ultrasonic sensor 310 may detect terrain features or an obstacle around the mobile robot 1 through the opening 303A.

In addition, the housing 300 may be provided with a light emitting unit 311. In more detail, the light emitting unit 311 may be provided in a rear portion of the upper cover 303.

The type of the light emitting unit 311 is not limited. In one example, the light emitting unit 311 may be, for example, an LED (Light Emitting Diode).

The light emitting unit 120 may be controlled by a control box 272 and may function as a rear warning light of the mobile robot 1.

On the other hand, a front recessed cover 300A corresponding to a front open portion OP1 may be provided inside a front portion of the housing 300 and a rear recessed cover 300B corresponding to a rear open portion OP2 may be provided inside a rear portion of the housing 300.

In more detail, the front recessed cover 300A may be provided inside a first outer cover 301A, and the rear recessed cover 300B may be provided inside a second outer cover 301B.

The front recessed cover 300A and the rear recessed cover 300B may be integrally formed with the outer cover 301, or may be separate members fastened to the outer cover 301.

The front recessed cover 300A may have a shape recessed horizontally rearward from the front open portion OP1. The rear recessed cover 300B may have a shape recessed horizontally forward from the rear open portion OP2.

The front recessed cover 300A may be positioned above a first inner cover 302A. The rear recessed cover 300B may be positioned above the second inner cover 302B.

The front recessed cover 300A may be formed with a front lidar avoidance portion 304A, which prevents interference with a front lidar 275A (see FIG. 4). The front lidar avoidance portion 304A may be formed by cutting a central portion of the front recessed cover 300A.

The rear recessed cover 300B may be formed with a rear lidar avoidance portion 304B, which prevents interference with a rear lidar 275B (see FIG. 4). The rear lidar avoidance portion 304B may be formed by cutting a central portion of the rear recessed cover 300B.

In addition, an inner open portion 304C may be formed in a top surface of the rear recessed cover 300B. In more detail, the inner open portion 304C may be formed on a top surface of the front portion of the rear recessed cover 300B. A front end of the inner open portion 304C may be formed to be continuous to the rear lidar avoidance portion 304B. The back cliff sensor 276B (see FIG. 4) may detect a state of the floor surface behind the mobile robot 1 through the inner open portion 304C and the rear open portion OP2.

The front recessed cover 300A may minimize exposure of the interior of the body 100 to the outside through the front open portion OP1. The rear recessed cover 300B may minimize exposure of the interior of the body 100 to the outside through the rear open portion OP2. In addition, the front recessed cover 300A and the rear recessed cover 300B may reinforce the rigidity of the housing 300.

In addition, the front recessed cover 300A may prevent a laser transmitted and received to and from the front lidar 275A from entering the body 100. The rear recessed cover 300B may prevent a laser transmitted and received to and from the rear lidar 275B from entering the body 100.

FIG. 9 is an enlarged view of "A1" in FIG. 8;

As described above, the pressure sensing module 320 may be provided between the outer cover 301 and the inner cover 302. The pressure sensing module 320 may detect an impact when a person or an obstacle hits the outer cover 301.

In more detail, the pressure sensing module 320 may be disposed in a gap "g" formed between the outer cover 301 and the inner cover 302. A plurality of pressure sensing modules 320 may be provided to be spaced apart from each other along the peripheral direction of the housing 300.

The pressure sensing module 320 may be provided in contact with the inner surface of the outer cover 301. Therefore, the pressure sensing module 320 may sensitively detect an impact applied to the outer cover 301.

The pressure sensing module 320 may include an outer metal panel 321, an inner metal panel 322, and a pressure-sensitive conductive sheet 323.

The outer metal panel 321 may be in contact with the inner periphery of the outer cover 301, and the inner metal panel 322 may be in contact with the outer periphery of the inner cover 302. The outer metal panel 321 and the inner metal panel 322 may be spaced apart from each other.

A pressure sensing sheet 323 may be disposed between the outer metal panel 321 and the inner metal panel 322. The pressure sensing sheet 323 may be in contact with the outer metal panel 321 and the inner metal panel 322, individually. The pressure sensing sheet 323 may be pressed between the outer metal panel 321 and the inner metal panel 322.

The pressure sensing sheet 323 may include a conductive material and may act as a resistor when voltage is applied. In this case, a resistance value of the pressure sensing sheet 323 may be changed according to a magnitude of a pressure applied to the pressure sensing sheet 323. Accordingly, it is possible to detect whether a pressure is applied to the pressure sensing sheet 323 and the magnitude of a pressure applied to the pressure sensing sheet 323 based on a change in the resistance value.

The battery 271 (see FIG. 4) may generate an electric potential difference between the outer metal panel 321 and the inner metal panel 322. That is, one of the outer metal panel 321 and the inner metal panel 322 may act as an anode plate and the other may act as a cathode plate. Accordingly, a predetermined current may flow through the pressure sensing sheet 323 according to the resistance value of the pressure sensing sheet 323.

When a person or an obstacle does not collide with the outer cover 301, the thickness and resistance of the pressure sensing sheet 323 are constant and therefore, the amount of current flowing through the pressure sensing sheet 323 may be kept constant.

On the other hand, when a person or an obstacle collides with the outer cover 301, the outer cover 301 may instantaneously press the outer metal panel 321, and the outer metal panel 321 may press the pressure sensing sheet 323. In this case, the pressure sensing sheet 323 may be instantaneously thinned to decrease the resistance value, and the amount of current flowing through the pressure sensing sheet 323 may increase rapidly in a short time. Thus, the pressure sensing module 320 may detect an impact applied to the outer cover 301 according to the amount of change in the amount of current.

As an example, the control box 271 (see FIG. 4) may receive an instantaneous amount of change in the amount of current flowing through the pressure sensing module 320 and calculate an intensity of the impact applied to the outer cover 301.

Meanwhile, the outer cover 301 and the inner cover 302 may each include an insulating material. Thus, the operation of the pressure sensing module 323 may be reliably achieved. In addition, the outer cover 301 may prevent the current flowing through the outer metal panel 321 from being shorted to the outside of the mobile robot 1. In addition, the inner cover 302 may prevent the current flowing through the inner metal panel 322 from being shorted to the inner module 200 positioned inside the housing 300.

FIG. 10 is an enlarged view of "A2" in FIG. 8, and FIG. 11 is an enlarged view of "A3" in FIG. 8.

An outer terminal 324 extending toward the interior of the inner cover 302 may be formed in an outer metal panel 321. An inner terminal 325 extending toward the interior of the inner cover 302 may be formed in an inner metal panel 322. The battery 271 (see FIG. 4) may apply a voltage to the outer metal panel 321 and the inner metal panel 322 through electric wires or harnesses connected to the outer terminal 324 and the inner terminal 325, respectively.

In this case, a first slit 331 through which the outer terminal 324 passes and a second slit 332 through which the inner terminal 325 passes may be formed in the inner cover 302. Thus, the battery may be easily electrically connected to the outer metal panel 321 and the inner metal panel 322.

When a plurality of pressure sensing modules 320 are provided, a plurality of first slits 331 and a plurality of second slits 332 may be formed in the inner cover 302.

An insulating sheet (not shown) may be provided on the inner periphery of the inner cover 302. The insulating sheet may cover connection portions of electric wires or harnesses connected to the outer terminal 324 and the inner terminal 325, respectively. Accordingly, it is possible to more reliably prevent the electric current from being shorted into the interior of the housing 300.

FIG. 12 is a perspective view showing a plurality of pressure sensing modules according to an embodiment of the present disclosure, and FIG. 13 is a plan view showing a plurality of pressure sensing modules according to an embodiment of the present disclosure.

The plurality of pressure sensing modules 320 may be disposed along the peripheral direction of the outer cover 301. The plurality of pressure sensing modules 320 may be spaced apart from each other along the peripheral direction of the outer cover 301. Thus, the pressure sensing modules 300 may independently detect an impact.

Each pressure sensing module 320 may have an arc shape. Accordingly, even when the outer cover 301 and the inner cover 301 include curved surfaces, the pressure sensing module 320 may be compactly provided between the outer cover 301 and the inner cover 302.

The plurality of pressure sensing modules 320 may include a front sensing module 320A facing the front side, a rear sensing module 320B facing the rear side, a first side sensing module 320C facing one side, and a second side sensing module 320D facing the other side.

Hereinafter, for convenience of description, a case where the first side sensing module 320C faces in the left direction and the second side sensing module 320D faces in the right direction will be described as an example.

The front sensing module 320A may detect an impact applied to the outer surface of a front portion of the outer cover 301. The rear sensing module 320B may detect an impact applied to the outer surface of a rear portion of the outer cover 301. The first side sensing module 320C may detect an impact applied to a left outer surface of the outer cover 301. The second side sensing module 320D may detect an impact applied to a right outer surface of the outer cover 301.

However, when an outer surface of the outer cover 301 is a curved surface, a boundary between a front/rear side and a lateral side may be ambiguous. In this case, a criterion may be needed to clarify the distinction between the front sensing module 320A, the rear sensing module 320B, the first side sensing module 320C, and the second side sensing module 320D.

A point at which a first virtual vertical plane P1 crossing an intermediate point left and right in a front-rear direction of the housing 300 and a second virtual vertical plane P crossing the intermediate point back and forth in the left-right direction of the housing 300 may be defined as the center "O" of the housing 300. In this case, a third virtual vertical plane P3 passing through the center "O" of the housing 300 and forming a 45 degree angle with the first virtual vertical plane P1 and the second virtual vertical plane P2 may be defined. In addition, a fourth virtual vertical plane P4 passing through the center "O" of the housing 300 and perpendicular to the third virtual vertical plane P3 may be defined. An area between the third virtual vertical plane P3 and the fourth virtual vertical plane P4 is divided into a front area FA, a rear area RA, a left area SA1, and a right area SA2 according to their positions.

The pressure sensing module 320 of which at least a half faces in the direction of the front area FA may be the front sensing module 320A. The pressure sensing module 320 of which at least a half faces in the direction of the rear area RA may be the rear sensing module 320B. The pressure sensing module 320 of which at least a half faces in the direction of the left area SA1 may be the first side sensing module 320C. The pressure sensing module 320 of which at least a half faces in the direction of the right area SA2 may be the second side sensing module 320D.

Since the mobile robot 1 travels forward or backward, the possibility of collision on the front and rear sides may be higher than the possibility of collision on the lateral sides. Therefore, the mobile robot 1 needs to sensitively detect the direction and intensity of an impact on a front or rear side. To this end, the deployment density of the pressure sensing modules 320 may be higher in the front and rear portions of the outer cover 301 than that of the side portions of the outer cover 301.

In more detail, the number of front sensing modules 320A may be greater than the number of the first side sensing modules 320C and the number of the second side sensing modules 320D individually. In addition, the number of rear sensing modules 320B may be greater than the number of the first side sensing modules 320C and the number of the second side sensing modules 320D individually.

For example, the number of the front sensing modules 320A and the number of the rear sensing modules 320B each may be three, and the number of the first side sensing modules 320C and the number of the second side sensing modules 320D each may be two.

With the above configuration, the front sensing module 320A and the rear sensing module 320B may more sensitively detect directions and intensities of impacts on front and rear sides.

In addition, a length of the front sensing module 320A in the peripheral direction of the outer cover 301 may be shorter than a length of each of the first side sensing module 320C and the second side sensing module 320D. In addition, a length of the rear sensing module 320B in the peripheral direction of the outer cover 301 may be shorter than a length of each of the first side sensing module 320C and the second side sensing module 320D.

Accordingly, more front sensing modules 320A and rear sensing modules 320B may be disposed in a limited space.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments.

The scope of the present disclosure should be construed on the basis of the accompanying claims, and all the technical ideas within the scope equivalent to the claims should be included in the scope of the present disclosure.

The invention claimed is:

1. A mobile robot, comprising:
   an outer cover defining an exterior of the mobile robot, the outer cover including an insulating material, the outer cover having an inner periphery;
   an inner cover spaced from the outer cover by a gap, the inner cover including an insulating material, the inner cover having an outer periphery facing the inner periphery of the outer cover;
   at least one pressure sensor disposed in the gap between the outer cover and the inner cover, the at least one pressure sensor including:
      an outer metal panel contacting the inner periphery of the outer cover;
      an inner metal panel contacting the outer periphery of the inner cover and spaced apart from the outer metal panel; and
      a pressure sensing sheet pressed between the outer metal panel and the inner metal panel, the pressure sensing sheet having a variable resistance; and
   a battery disposed inside the outer cover and connected to the outer metal panel and the inner metal panel, the battery being configured to generate an electric potential difference between the outer metal panel and the inner metal panel.

2. The mobile robot of claim 1, wherein the at least one pressure sensor is provided in a lower portion of the outer cover.

3. The mobile robot of claim 1, wherein the at least one pressure sensor includes a plurality of pressure sensors spaced apart from each other along a peripheral direction of the outer cover.

4. The mobile robot of claim 3, wherein each pressure sensor has an arc shape in the peripheral direction.

5. The mobile robot of claim 3, wherein a greater number of the plurality of pressure sensors are provided in a front portion and a rear portion of the outer cover than in side portions of the outer cover between the front portion and the rear portion.

6. The mobile robot of claim 3, wherein the plurality of pressure sensors includes:
at least one front sensor configured to face a front side of the mobile robot;
at least one rear sensor configured to face a rear side of the mobile robot;
at least one first side sensor configured to face a first side of the mobile robot between the front side and the rear side of the mobile robot; and
at least one second side sensor configured to face a second side of the mobile robot opposite the first side of the mobile robot.

7. The mobile robot of claim 6, wherein a total number of the front sensors is greater than a number of the first side sensors and a number of the second side sensors.

8. The mobile robot of claim 7, wherein a total number of the rear sensors is greater than a number of the first side sensors and a number of the second side sensors.

9. The mobile robot of claim 7, wherein, with respect to the peripheral direction of the outer cover, a length of each front sensor is shorter than a length of each first side sensor and a length of each second side sensor.

10. The mobile robot of claim 7, wherein, with respect to the peripheral direction of the outer cover, a length of each rear sensor is shorter than a length of each first side sensor and a length of each second side sensor.

11. The mobile robot of claim 1, wherein the outer metal plate includes an outer terminal,
wherein the inner metal plate includes an inner terminal, and
wherein the inner cover includes:
a first slit through which the outer terminal of the outer metal panel passes; and
a second slit through which the inner terminal of the inner metal panel passes.

12. The mobile robot of claim 11, further comprising an insulating sheet on an inner periphery of the inner cover.

13. The mobile robot of claim 1, further comprising an insulating sheet on an inner periphery of the inner cover.

14. The mobile robot of claim 1, further comprising:
a driver configured to move the mobile robot; and
a control box configured to control the driver, the control box being connected to the at least one pressure sensor to detect a collision of the outer cover with an object based on a change in current flowing through the at least one pressure sensor.

15. The mobile robot of claim 1, further comprising an upper cover located at an upper end of the outer cover to cover the gap.

16. A mobile robot, comprising:
a housing defining an appearance of the mobile robot, the housing including:
an outer cover including an insulating material, the outer cover having an inner periphery;
an inner cover spaced from the outer cover by a gap, the inner cover including an insulating material, the inner cover having an outer periphery facing the inner periphery of the outer cover;
an inner module disposed inside the housing, the inner module including a driver in a lower portion of the inner module;
at least one pressure sensor disposed in the gap between the outer cover and the inner cover, the at least one pressure sensor including:
an outer metal panel contacting the inner periphery of the outer cover;
an inner metal panel contacting the outer periphery of the inner cover and spaced apart from the outer metal panel; and
a pressure sensing sheet pressed between the outer metal panel and the inner metal panel, the pressure sensing sheet having a variable resistance; and
a battery disposed in the inner module and connected to the outer metal panel and the inner metal panel, the battery being configured to generate an electric potential difference between the outer metal panel and the inner metal panel.

17. The mobile robot of claim 16, wherein the at least one pressure sensor includes a plurality of pressure sensors spaced apart from each other along a peripheral direction of the outer cover.

18. The mobile robot of claim 17, wherein each pressure sensor has an arc shape in the peripheral direction.

19. The mobile robot of claim 17, wherein a greater number of the plurality of pressure sensors are provided in a front portion and a rear portion of the outer cover than in side portions of the outer cover between the front portion and the rear portion.

20. The mobile robot of claim 16, further comprising a control box configured to control the driver, the control box being connected to the at least one pressure sensor to detect a collision of the outer cover with an object based on a change in current flowing through the at least one pressure sensor.

* * * * *